(12) United States Patent
Ladouceur et al.

(10) Patent No.: US 7,305,257 B2
(45) Date of Patent: Dec. 4, 2007

(54) PORTABLE ALERTER FOR WIRELESS DEVICE

(75) Inventors: Norman M. Ladouceur, Waterloo (CA); Jason T. Griffin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 147 days.

(21) Appl. No.: 10/825,104

(22) Filed: Apr. 16, 2004

(65) Prior Publication Data
US 2005/0233774 A1 Oct. 20, 2005

(51) Int. Cl.
*H04Q 7/00* (2006.01)

(52) U.S. Cl. ............... 455/567; 455/557; 455/569.1; 455/426

(58) Field of Classification Search ........... 455/567, 455/550.1, 557, 42, 426, 569.1, 41.2, 415; 370/351; 345/156; 320/107; 379/446
See application file for complete search history.

(56) References Cited

U.S. PATENT DOCUMENTS

| | | | | |
|---|---|---|---|---|
| 5,535,274 | A * | 7/1996 | Braitberg et al. | 379/446 |
| 5,878,354 | A | 3/1999 | Hasegawa | |
| 5,924,044 | A | 7/1999 | Vannatta et al. | |
| 6,591,085 | B1 * | 7/2003 | Grady | 455/42 |
| 6,762,585 | B2 * | 7/2004 | Liao | 320/107 |
| 2001/0012761 | A1 | 8/2001 | Mitama et al. | |
| 2001/0039195 | A1 * | 11/2001 | Nickum | 455/557 |
| 2002/0115478 | A1 * | 8/2002 | Fujisawa et al. | 455/567 |
| 2003/0003965 | A1 * | 1/2003 | Gough | 455/567 |
| 2003/0078071 | A1 * | 4/2003 | Uchiyama | 455/557 |
| 2004/0214594 | A1 * | 10/2004 | Holman | 455/550.1 |
| 2005/0157698 | A1 * | 7/2005 | Park et al. | 370/351 |
| 2005/0179654 | A1 * | 8/2005 | Hawkins et al. | 345/156 |
| 2005/0266891 | A1 * | 12/2005 | Mullen | 455/567 |

FOREIGN PATENT DOCUMENTS

WO WO 00/33468 6/2000

OTHER PUBLICATIONS

European Communication under Rule 51(4) EPC Application No. 04101571.0-2414 Date: May 22, 2005.

* cited by examiner

*Primary Examiner*—Joseph Feild
*Assistant Examiner*—Michael Vu
(74) *Attorney, Agent, or Firm*—Bereskin & Parr

(57) ABSTRACT

The present invention is a remove-able portable alerter for a portable wireless communication host device. The alerter provides a method to receive un-obtrusive alerts from the host device informing the user of incoming notifications. Users are informed of alerts without having to wear, hold, carry or listen to alerts from the host device. The invention provides an alternative to carrying a larger, bulkier host communication device. The alerter provided greater control and manageability of incoming notification enabling them to respond to alerts at their convenience.

8 Claims, 5 Drawing Sheets

PORTABLE ALERTER FOR WIRELESS DEVICE

BACKGROUND

1. Technical Field

The present invention relates generally to the field of wireless communication and wireless communication devices.

2. Description of the Related Art

The invention has particular applicability to the field of portable wireless communication devices and personal notification. Examples of portable wireless communication devices (herein refer to as host device) include pagers, cellular phones, cellular smart-phones, wireless organizers, and/or wirelessly enabled notebook computers.

Personal notification refers to a means of alerting the recipient of an incoming alert consisting of any form of audio, visual or touch notification. Examples of personal notification include a phone call, voice message, email, SMS message, instant message, alarm or a calendar alert.

A wireless alerter is an electronic notification device that informs the user of incoming alerts using sensory alerts. The alerts may be visual (text, light), sound (beep or tone) or touch (vibrate). The alerter is also small and portable and can be worn or carried on the human body.

There is a need for a method to un-obtrusively alert users of incoming alerts. Under certain circumstances, users may not wish to carry their host device or be disturbed by alerts, but want to be informed of the incoming alerts. Examples of these circumstances include formal parties, important meetings, or factors of convenience and comfort for females carrying their host device in a purse or handbag.

SUMMARY

The present invention is a portable wireless alerter that receives incoming alert from a portable wireless communication device (herein refer to as host device). The invention permits users to be informed of notifications from their host device without physically carrying or wearing the host device.

The alerter may be a separate electronic device from the host device or a remove-able plug-in mounting to the host device. The alerter utilize short-range wireless communication protocols (e.g., Bluetooth™ or ZigBee) to communicate with the host device to receive incoming alerts from the host device.

By separating the alert notification from the host device, the user may attend to the alert without carrying the host device. The portable alerter may be hidden from public view or worn inconspicuously. This is beneficial to users who carry their host device in their purse, handbag or briefcase; the alerter allows them to keep their host device hidden and provides them better control on managing alerts.

Other aspects and features of the present application will become apparent to those ordinarily skilled in the art upon review of the following description of specific embodiments of the present invention in conjunction with the accompanying figures.

BRIEF DESCRIPTION OF THE DRAWINGS

Embodiments of the present application will now be described, by way of example only, with reference to the attached figures, wherein.

Like reference numerals are used throughout the figures to denote similar elements and features.

DETAILED DESCRIPTION OF THE DRAWINGS

The present invention provides a method to receive unobtrusive alerts from the host device through a portable alerter attachment. The alerter attachment may operate as a remove-able plug-in to the host device (i.e., referred to as un-tethered mode) or may operate connected to the host device (i.e., referred to as tethered mode).

Figure 1:
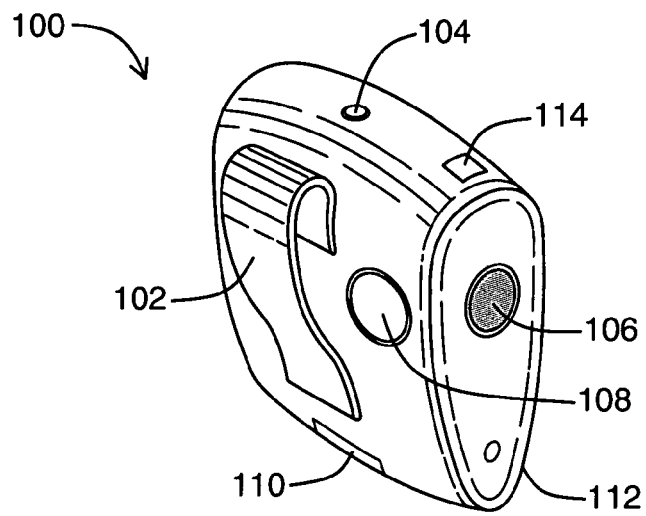
FIG. 1 is a block diagram illustrating a portable wireless alerter.

FIG. 1 is a block diagram illustrating one embodiment of a portable wireless alerter. The wireless alerter 100 is small, pager-sized device. The wireless alerter 100 include a clip or fastener 102 to attach the device to the human body for easy carry, a battery 108 acting as a power supply, a connection interface 110, a wireless receiver 114 and a form of notification hardware.

The notification hardware may consist of at least one form of notification output including a light 104 to visually notify users of incoming alerts, a speaker 106 to output audio notification and/or a vibrator 112 that outputs touch notification. The current embodiment of the wireless alerter 100 consists of all three forms of notification hardware.

The light 104 may be a light emitting diode (LED) or another form of electronic light that provides visual notification. The connection interface 110 connects the alerter 100 to a mating connector on a host device. The wireless receiver 114 enables the wireless alerter 100 to receive incoming wireless notifications from the host device. The wireless receiver 114 may be an infrared receiver, a Bluetooth™ receiver, a RFID receiver, an 802.11 WiFi receiver or any other forms of wireless short-range communication receiver.

The alerter 100 have preferably a teardrop-shaped cross sectional design, but may alternatively have an oval, rectangular, or other cross sectional shapes. The teardrop shape enables a sleeker and more stylish design that also provides a seamless connection with the host device. Other shapes that meet these criteria will also suffice.

The placement of the speaker 106 is located proximally at the centre of the teardrop-shaped side surface, but alternatively may be disposed at the edge of the side surface. Furthermore, the light 104, battery 108 and speaker may be located proximally to different areas and/or surfaces of alerter 100.

Figure 2:
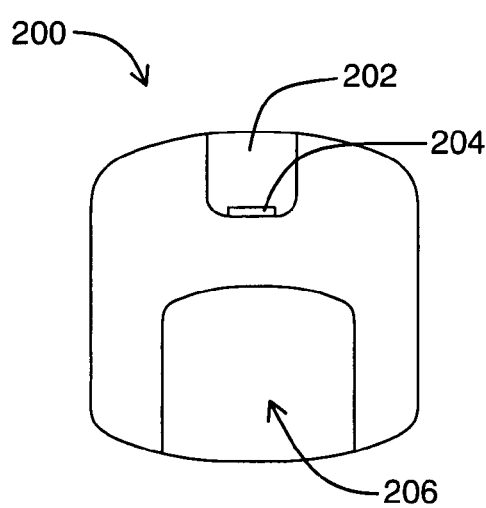
FIG. 2 s a block diagram illustrating the external surface of a host mobile communication device with a cavity to accommodate a portable alerter.

FIG. 2 is a block diagram illustrating the external surface of a host mobile communication device with a cavity to accommodate a portable alerter. The external surface of the host mobile communication device (or host device) 200 consists of a battery component 206, a device cavity 202 where the wireless alerter 100 will slide in. The battery component 206 houses the device power source. In a preferred embodiment, the cavity 202 and battery component 206 is located on the back surface of the host device 200.

On one surface of the cavity 202, preferably the bottom surface, there is a host connection interface 204 that forms a mating connection with the alerter connection interface 110. The connection interface for the alerter 110 and the host device 204 may be a serial, parallel, USB, Firewire (IEEE 1394), wireless (e.g., Bluetooth™) or another form of mating connection.

The material of the body of the alerter 100 and host device 200 is preferably plastic, but may be of any suitably strong and resilient material.

Figure 3:
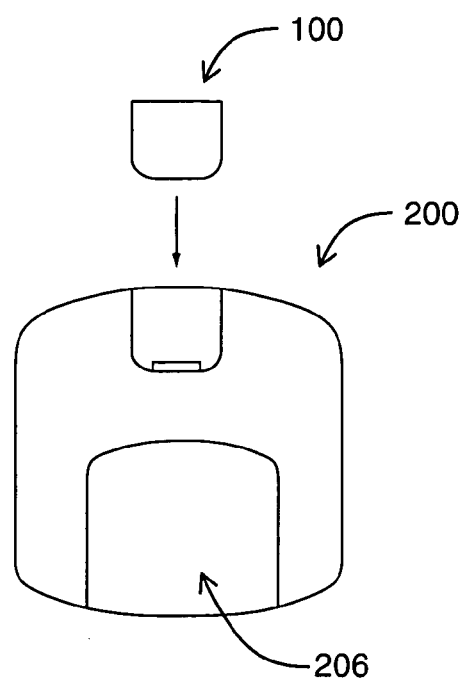
FIG. 3 is a block diagram illustrating the connection of a host device with a portable alerter.

FIG. 3 is a block diagram illustrating the connection of a host device with a portable alerter. When the wireless alerter 100 is in an un-tethered mode, the alerter 100 will be removed from the device cavity 202. The user will only carry the alerter 100 to be informed of incoming notifications.

In the present embodiment, when the alerter 100 is in tethered mode, it will slide into the host device cavity 202 and form a mating connection between the connection interfaces (110 and 204). The user will receive incoming notification on the host device 200 through the tethered wireless alerter.

Other embodiments of this invention may have a wireless connection interface (e.g., Bluetooth™). In this embodiment, a mating connection still exists, but the connection is used to charge the alerter's battery or used to house the alerter on the host device.

Figure 4:
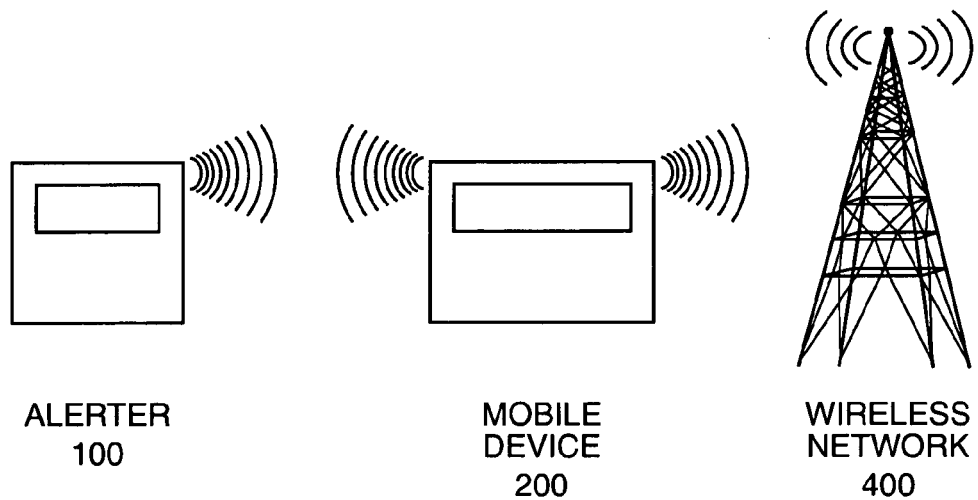
FIG. 4 is a block diagram illustrating the communication means between the portable alerter, host device and wireless network.

FIG. 4 is a block diagram illustrating the communication means between the portable alerter, host device and wireless network. The wireless network 400 sends a notification message to the host mobile device 200. The host device 200 will receive this message and retransmit it to the wireless alerter 100. The host device 200 contains two sets of antennas: one to communicate with the wireless network 400, the other, to communicate with the wireless alerter 100.

Communication between the host device 200 and the wireless network 400 occurs through a wireless wide-area communication protocol including, but not limited to such protocols as cellular voice (GSM, CDMA, TDMA, iDEN), paging (FLEX, REFLEX) and/or dedicated data networks such as Mobitex™ and DataTAC™.

The present embodiment illustrates an un-tethered mode where the host device 200 will send the notification message wirelessly to the wireless alerter using short-range wireless communication protocols. Short-range communication protocols include infrared, Bluetooth™, IEEE 802.11 (WiFi) or RFID. In a tethered mode, wireless communication will not be necessary; communication will be conduction through the connection interfaces (110 and 204).

Figure 5:
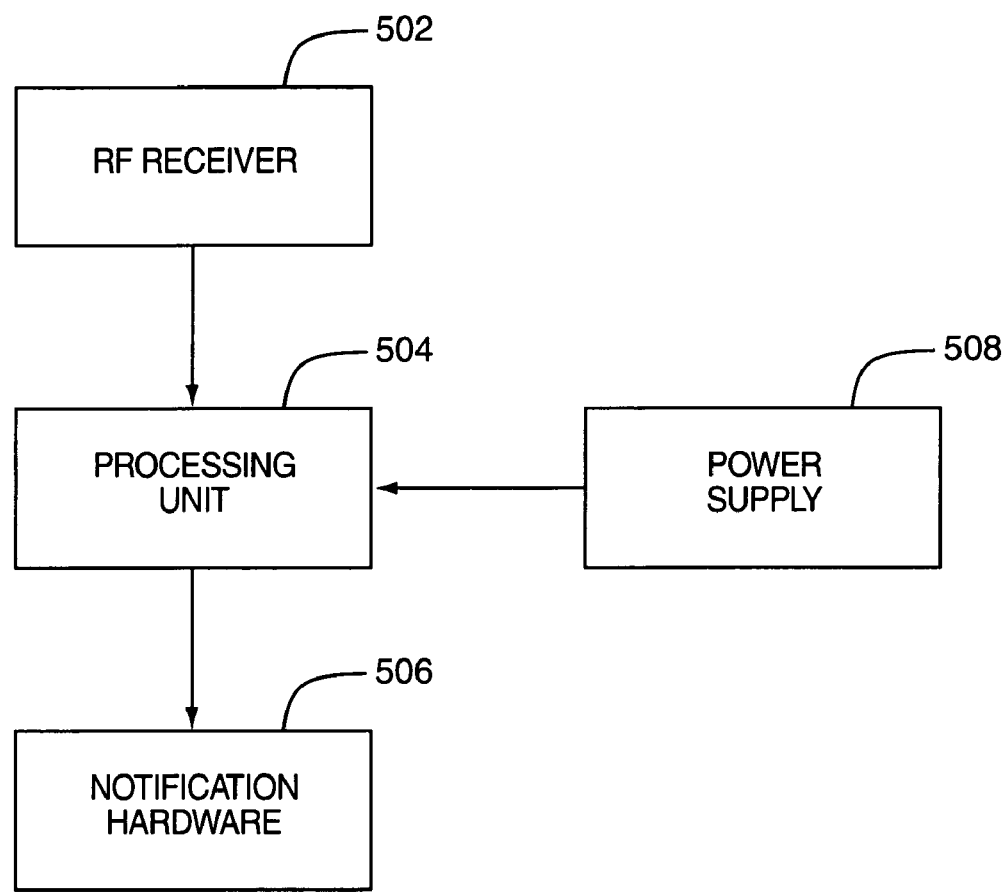
FIG. 5 is a block diagram illustrating the internal components of the portable alerter.

FIG. 5 is a block diagram illustrating the internal components of the portable alerter. Key components include the RF receiver 502, the processing unit 504, the power supply 508 and the notification hardware 506. The power supply 508 is usually a battery, usually an alkaline or rechargeable battery. The processing unit 504 contains a microprocessor and is responsible for processing incoming alerter signals and output the result to the notification hardware 506. The notification hardware 506 consists of either a light 104, a speaker 106 or a vibrator 112.

Figure 6:
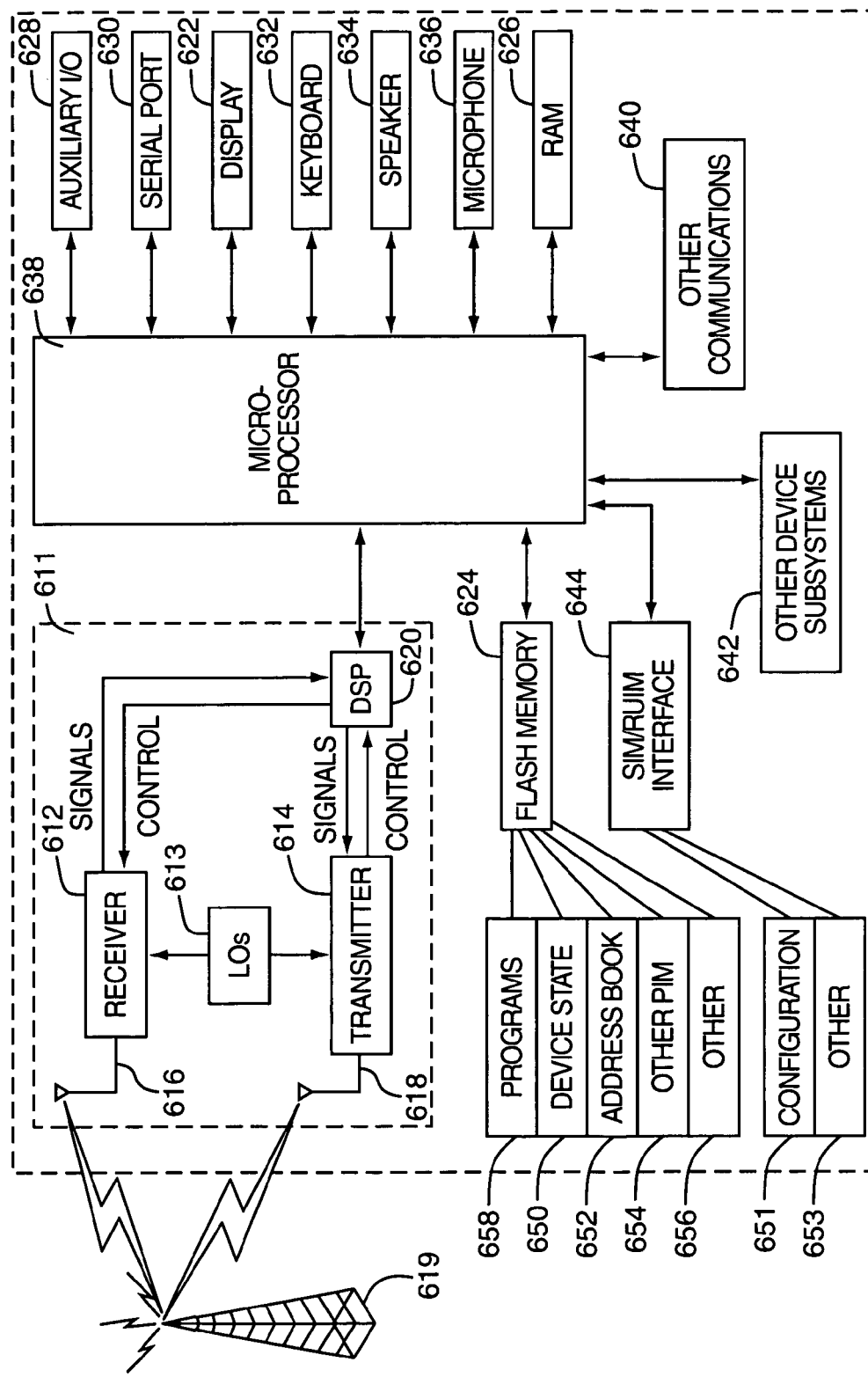
FIG. 6 is a block diagram illustrating subsystems of interest in a mobile communication device.

FIG. 6 is a block diagram illustrating the subsystems of interest in a mobile communication device. Mobile communication device 600 is preferably a two-way wireless electronic communication device having at least voice and data communication capabilities. Mobile electronic device 200 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile communication device 600 is enabled for two-way communication, it incorporates a communication antenna subsystem 611, including both a receiver 612 and a transmitter 614, as well as associated components such as one or more, preferably embedded or internal, antenna elements 616 and 618, local oscillators (LOs) 613, and a processing module such as a digital signal processor (DSP) 620. As will be apparent to those skilled in the field of communications, the particular design of the communication subsystem 611 is dependent upon the communication network in which the device is intended to operate.

Mobile electronic device 600 preferably includes a microprocessor 638 that controls the overall operation of the device. Communication functions, including at least data and voice communications, are performed through communication subsystem 611. Microprocessor 638 also interacts with further device subsystems such as the display 622, flash memory 624, random access memory (RAM) 626, auxiliary input/output (I/O) subsystems 628, serial port 630, keyboard 632, speaker 634, microphone 636, a short-range communications subsystem 640 and any other device subsystems generally designated as 642.

Figure 7:
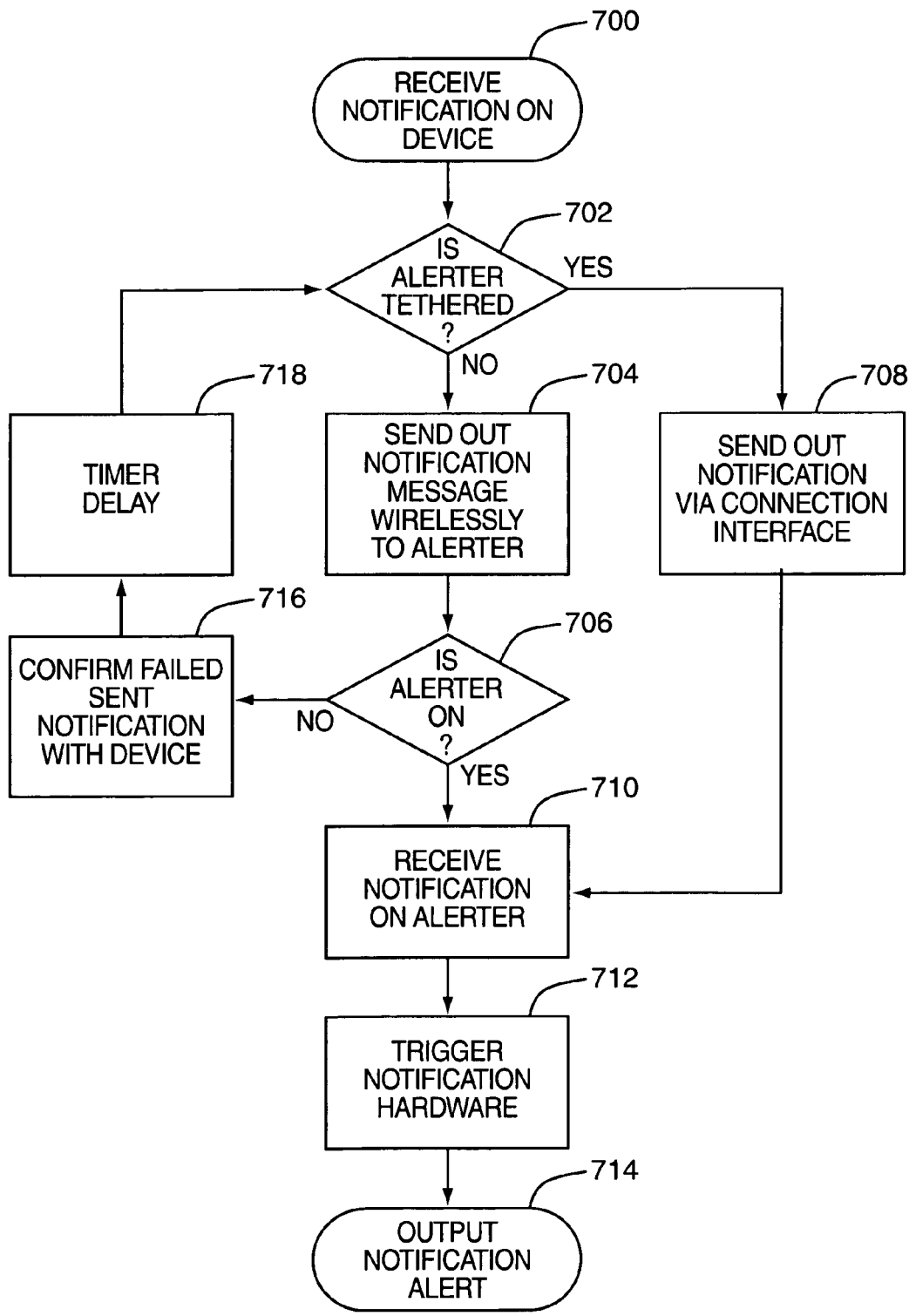
FIG. 7 is a flow chart illustrating a process of receiving notification on the mobile alerter.

FIG. 7 is a flow chart illustrating a process of receiving notification on the mobile alerter. The process begins with a reception of a notification message on the host device at step 700. The host device 200 will then determine whether the wireless alerter 100 is tethered at step 702.

If the wireless alerter 100 is tethered, a notification message will be sent to the alerter across the connection interface at step 708. The alerter will receive the notification at step 710 and then trigger to output this notification using the requested notification hardware at step 712. The final result is a notification alert is outputted (step 714).

However, if the wireless alerter is un-tethered (i.e., alerter is not available) at step 702, the host device 200 will sent out a notification message wirelessly to the alerter at step 704. The system will then determine whether the alerter is on (step 706). If it is on, the alerter will receive the notification on the alerter (step 710), trigger the output notification hardware (step 712) and output the notification alert (step 714).

If the alerter is not on (step 706), the host device will be notified of the failed communication attempt. It will then confirm the failed notification attempt at step 716 and create a timer delay sequence at step 718 where it will loop back to step 702 to determine whether the alerter is tethered and re-send the notification message to the alerter (step 704). This looping process will continue until a notification message is sent to the alerter. The timer delay at step 718 is user-configurable and can range from a small interval (e.g., once every second) to a large interval (e.g., once every 15 minutes).

Certain embodiments of this invention may have the host device use its default notification system (i.e., built-in notification system of host device not connected to the wireless alerter) to notify the user if a failed connection is detected at the host device.

The invention addresses the need of un-obtrusive, wearable notification without carrying a larger and often bulkier host device. The alerter offer the advantages of greater control, convenience, and manageability of incoming alerts. Users may use the host device to reply to the alerter notification of importance or may chose to ignore the alert to respond at a more convenient time. In addition, host device security is heightened if the host device need not be displayed.

The un-obtrusive and wearable characteristics of the alerter enable the alerter to be worn out of sight and concealed from view (e.g., attached to undergarments).

Furthermore, the wearable nature of the invention enables the invention to be worn as a fashion accessory to complement one's garment.

Both the tethered and un-tethered remove-able alerter invention permits the option of customizing different alerts. It is preferable that software filters be used to configure different alerts for different individuals. For example, the alerter can be configured for ring tone 1 from sender A and ring tone 2 from sender B.

The following invention is not exclusive to communicating with one host device. It is preferable that the alerter be extended to support multiple host devices, where the host device may be the same or different types of devices. Examples of other host devices include cellular, wireless organizers, and/or wirelessly enabled notebook computers.

One extension of this invention may include adding software filters to customize different alerts for different individuals. A further extension may be to enable the wireless alerter to communicate with multiple host devices.

The above-described embodiments of the present application are intended to be examples only. Those of skill in the art may effect alterations, modifications and variations to the particular embodiments without departing from the scope of the application.

We claim:

1. A mobile alerter for a mobile communication device, said mobile alerter comprising:
   a processor;
   a power supply;
   a wireless receiver to communicate with said mobile communication device;
   notification hardware for triggering a notification of an incoming alert; and
   a connection interface for removably connecting said mobile alerter to a host connection interface of a cavity of said mobile communication device;
   said mobile alerter forming the notification unit of said mobile communication device such that
      when said mobile communication device determines that said mobile alerter is in a tethered mode in which said alerter is inserted into said cavity of said mobile communication device such that said connection interface is coupled with said host connection interface, said mobile alerter outputs notification alerts for said mobile communication device triggered when a notification message is received from said mobile communication device by said mobile alerter via said connection interface, and
      when said mobile communication device determines that said mobile alerter is in an un-tethered mode in which said alerter is not inserted into a cavity of said mobile communication device, said mobile alerter outputs notification alerts for said mobile communication device triggered when a notification message is received from said mobile communication device by said mobile alerter via said wireless receiver.

2. The mobile alerter of claim 1, wherein said notification hardware comprises at least one type of hardware selected from the following group: a speaker, a vibrator, and a light.

3. The mobile alerter of claim 1, wherein said power supply comprises a battery.

4. A system for receiving notifications on a mobile alerter comprising:
   a mobile alerter as claimed in claim 1, and
   a mobile communication device comprising a processor;
   a wireless communication means to communicate with a wireless network;
   a wireless transmitter for communication with a wireless network;
   a wireless receiver for communication with a wireless network;
   a wireless transmitter for communication with said mobile alerter;
   a housing with a cavity for receiving said mobile alerter; and
   a host connection interface for receiving said mobile alerter.

5. The system of claim 4, wherein said wireless communication means comprises at least one form of communication means selected from the following group: a voice communication means, and a data communication means.

6. The system of claim 4, wherein said host connection interface comprises at least one form of interface selected from the following group: a serial interface, a parallel interface, a USB interface, a Firewire interface, and a wireless interface.

7. The system of claim 4, wherein the connection interface of the mobile device is located within the cavity of the housing of the mobile device, the cavity being adapted to slidably receive the mobile alerter.

8. A method for receiving notifications on a mobile alerter, said mobile alerter removably connectable to a mobile device, the method comprising the steps of:
   receiving a first notification message on a mobile communication device from a wireless network;
   said mobile communication device determining if said mobile alerter is in a tethered mode in which said alerter is inserted into a cavity of said mobile communication device such that a connection interface of said mobile alerter is coupled to a host connection interface of said cavity of said mobile communication device, or in an un-tethered mode in which said alerter is not inserted into a cavity of said mobile communication device; and
   sending out a second notification message from said mobile communication device to said mobile alerter, said mobile alerter forming the notification unit of said mobile communication device such that
      when said mobile communication device determines that said mobile alerter is in a tethered mode, said mobile alerter outputs notification alerts for said mobile communication device triggered when a second notification message is received from said mobile communication device by said mobile alerter via said connection interface, and
      when said mobile communication device determines that said mobile alerter is in an un-tethered mode, said mobile alerter outputs notification alerts for said mobile communication device triggered when a second notification message is received from said mobile communication device by said mobile alerter via a wireless receiver;
   receiving said second notification message on said mobile alerter; and
   triggering notification hardware to alert a user of said second notification message received by said mobile alerter of said mobile communication device.

* * * * *